July 11, 1933.  O. MEYER  1,917,455

PRESSURE FLUID CONTROL VALVE

Filed March 23, 1932

Inventor:
O. Meyer
By: Marks & Clerk
Attys.

Patented July 11, 1933

1,917,455

UNITED STATES PATENT OFFICE

OTTO MEYER, OF NUREMBERG, GERMANY, ASSIGNOR TO FIRM: ARMATUREN- UND MASCHINENFABRIK AKT. GES., VORM, J. A. HILPERT, OF NUREMBERG, GERMANY

PRESSURE FLUID CONTROL VALVE

Application filed March 23, 1932, Serial No. 600,742, and in Germany March 28, 1931.

This invention relates to valves for controlling the supply of compressed air from an air compressor to pipe lines and its withdrawal from said pipe lines.

It is known to convey liquids by means of compressed air which is alternately supplied to and withdrawn from collecting chambers by means of an air compressor which withdraws the air from one chamber while the liquid collects therein and forces compressed air into another chamber to eject liquid which has collected therein, the supply of compressed air to the collecting chambers being periodically changed over by means of a fluid-actuated reversing valve operated under the control of a master valve which is positively actuated by the compressor.

The present invention has for its object to provide reversing valve apparatus of the kind referred to which, while being simpler in construction than the previously proposed structure of the kind referred to, will be reliable in operation, will allow a sufficient cross-sectional area of flow for the compressed air, will enable equalization of pressure in the pipe lines during the reversal and consequently the conveyance of the liquid to take place rapidly. With these and other objects in view, the invention consists in a reversing valve, comprising a valve casing having five annular ports, of which passages through the intermediary of a piston slide valve having three pistons the middle annular port is permanently in communication with the suction pipe of the compressor, while the annular ports to the left and right thereof are in communication with the pipes through which the compressed air is supplied and withdrawn and the two outermost annular ports with the delivery pipe of the compressor. As, furthermore, the two outermost annular ports are, according to the invention, connected by two passages with the delivery pipe of the compressor, the reversing valve, although of relatively small dimensions, has large cross-sectional areas of flow, so that the frictional losses are only small and the apparatus operates in a reliable manner with a very small stroke of the piston slide valve. Further advantages are that the piston slide valve is completely balanced, requires only slight pressure for reversing and can be effectively packed.

The reversing valve is connected by means of two pipes to a master valve which is constructed substantially in the form of a rotary valve and is driven positively by the compressor.

Figure 1:
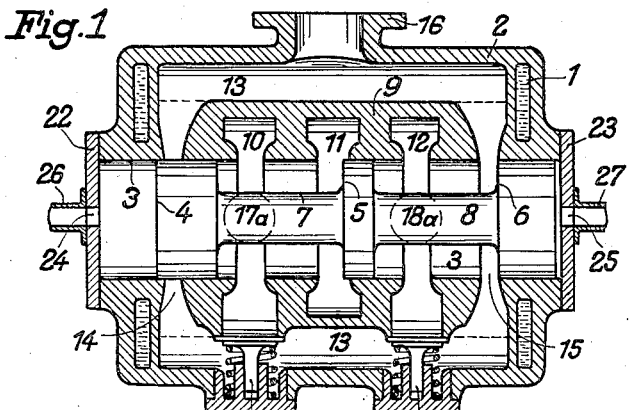
Figure 2:
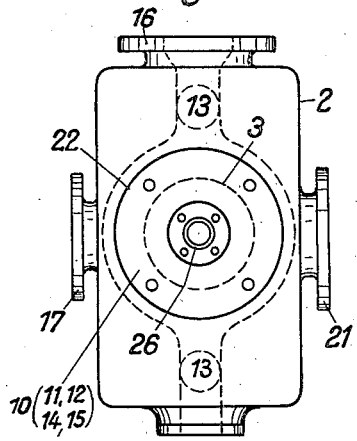
Figure 3:
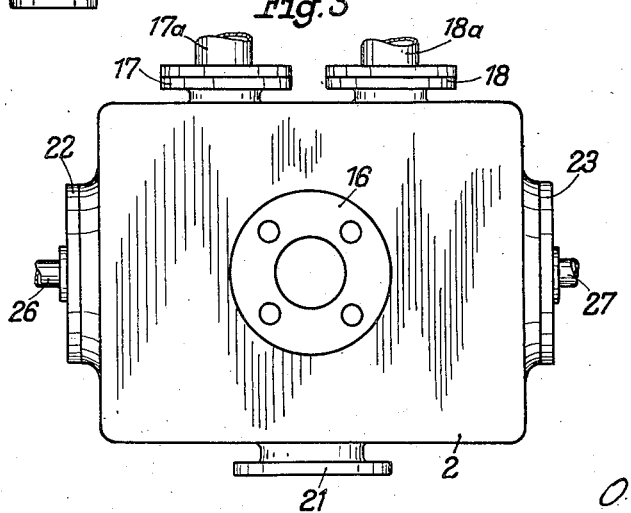

In the accompanying drawing a constructional example of the invention is shown,

Fig. 1 being a longitudinal section through the reversing apparatus,

Figs. 2 and 3 a side view and plan view and

Figure 4:
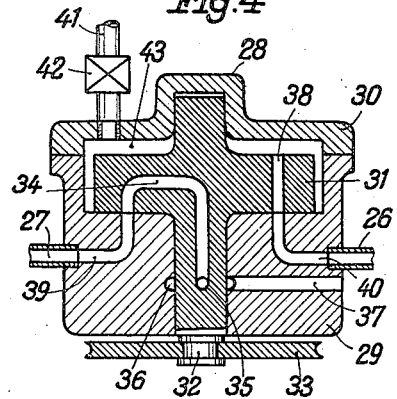

Fig. 4 an axial section through the reversing valve.

In a casing 2 provided with cooling chambers 1 and in a midde bore 3 of the same a piston slide valve is guided, which has three pistons 4, 5 and 6 which are connected with each other by rods 7 and 8. The middle part 9 of the casing which guides the piston slide valve has three annular ports 10, 11, 12. Between the outer casing wall and the part 9 of the casing are two tubular passages 13 which communicate with the bore 3 for the piston slide valve through two annular ports 14, 15.

The casing 2 has a connecting branch 16, to which the delivery pipe of the compressor is connected. Through the tubular passages 13, the annular ports 14, 15 are placed constantly under pressure and are permanently connected with one another, so that each annular port 14 or 15 is always fed from two sides. To the flanges 17 and 18 the pipes 17a and 18a are connected which are under varying pressure conditions and which are connected to the annular ports 10 and 12. The latter are also connected by equalizing valves 19 and 20 with the passages 13. The middle annular port 11 is permanently connected to the suction pipe of the compressor, which is connected to the flange 21 of the casing. The two covers 22 and 23 have bores 24 and 25 to which pipes 26 and 27 are connected, which lead to the master valve.

The master valve 28 comprises a casing 29 which is closed by a cover 30. In the casing 29 a rotary member 31 is journalled on the outwardly extending shaft 32 of which a driving wheel 33 is mounted, which is driven by the compressor shaft directly or from it indirectly. The rotary member 31 has a U-shaped passage 34, the axial bore of which communicates through a transverse bore 35 with an annular passage 36 in the casing 29 which passage communicates with the outer air through a radial bore 37. The rotary member is also provided with a bore 38 which extends parallel to the axis of rotation. To the casing 29 the two pipes 26 and 27 coming from the reversing valve are connected, which open into the angle passages 39 and 40. To the latter the passages 34 and 38 can be alternately connected. To an opening in the cover 30 of the reversing valve a pipe 41 coming from the delivery side of the compressor is connected, in which a throttle valve 42 is provided. The reduced compressed air passes into the space 43 above the rotary member 31 and thence either into the pipe 26 or the pipe 27. One of these two pipes is therefore under pressure while the other is connected to the outside air.

In order that the compressed air in one or other of the pipes, which reverses the piston slide valve, shall not escape too rapidly, small adjustable throttle valves are provided in these connecting pipes. This prevents a hard impact of the piston slide valve and causes a gentle elastic motion.

For cooling the quantities of compressed air flowing through the reversing valve, the cooling chambers 1 of the casing 2 are swept through by the cooling water of the compressor.

The reversing valve and the master valve associated with it operate in the following manner.

With the master valve and the piston slide valve in the position shown in the drawing the compressed air coming from the pipe 41 by way of the space 43, the bore 38, the angle passage 40, and the pipe 26, has just brought the piston slide valve into the position shown in Fig. 1, in which the delivery pipe of the compressor delivers the compressed air by way of the passage 13 and through the annular ports 14, 15 from above and below to the annular port 12 from where it flows by way of the branch 18 into the pipe 18a. The annular port 11 which is permanently under the suction action of the compressor is connected to the annular port 10 and the compressor draws by suction through the branch 17 the air out of the pipe 17a.

The pressure in the pipe 18a rises under the action of the compressor to the desired maximum pressure and the pressure in the pipe 17a sinks to the atmospheric pressure. In the meantime the rotary member 31 has turned through 180° so that the bore 38 communicates with the angle passage 39 and with the pipe 27. At the same time the U-shaped passage 34 is connected to the pipe 26. At this moment the reversal of the piston slide valve takes place, that is to say, the piston 6 covers the annular port 15 and the piston 4 uncovers the annular port 14, while the piston 5 comes to the left of the annular port 11. During the displacement of the piston slide valve the air behind the piston can escape into the atmosphere through the master valve by way of the passages 34, 35, 36, 37. The delivery pipe of the compressor is now connected by way of the passages 13 and the annular port 14 with the annular port 10, while on the other hand the annular ports 11 and 12 are connected to the suction pipe of the compressor. Assuming that in the pipe 18a of the system there exists a high pressure and in the pipe 17a atmospheric pressure, then owing to the sudden connection of the passage 13 which the pipe 17a a drop in pressure occurs in the spaces 13, so that the pressure coming from the pipe 18a opens the valve 20 and an equalization of pressure takes place between the pipes 18a and 17a. The compressor therefore need not raise the pressure in the pipe 17a from one atmosphere to the working pressure, but need only increase the equalized pressure to the working pressure. An increase in pressure thereupon takes place in the pipe 17a up to the desired maximum pressure and in the pipe 18a a reduction in pressure down to atmospheric pressure. By the time these pressure limits are reached, the master valve has turned again through 180° and has returned into the position shown in Fig. 4. The sequence of operations is then repeated again.

The reversing valve and its master valve can owing to their small dimensions be mounted by means of flanges either together or each separately directly on the compressor.

What I claim is:

1. For controlling the alternate supply to and withdrawal of compressed air from a pipe system comprising two pipes through which the compressed air is supplied and withdrawn, a reversing valve comprising a valve casing having a compressed air inlet opening, a compressed air withdrawal opening and communication openings for establishing communication between the valve casing and each of the said two pipes, said casing also having a piston valve chamber with five anular ports therein, namely a central port in open communication with the compressed air withdrawal opening, two intermediate ports in open communication respectively with the said communication openings and two outside ports in open communication with the compressed air inlet opening, a piston valve having a central piston and two outside pistons in said piston valve chamber, said piston being movable in the valve chamber from a position in which one outside piston is located to uncover one of the outside ports to place it in open communication with the intermediate port adjacent thereto and the other outside piston is located to cover the other outside port into a position in which the second-mentioned outside piston is located to uncover the second-mentioned outside port and the first-mentioned piston is located to cover the first mentioned outside port, said central piston being adapted in each of said positions of the piston valve to uncover the central port to place the latter in open communication with the intermediate port adjacent the outside port which is covered by the respective outside piston, supply pipes for admitting compressed air to the ends of the piston valve and a master valve for controlling the supply of compressed air through said supply pipe to each end of the piston valve alternately for reversing the valve.

2. A reversing valve as set forth in claim 1, in which the piston valve chamber is spaced from the valve casing so as to form a tubular space, in the casing, the two outside ports and the compressed air inlet opening being in open communication with said space.

3. A reversing valve as set forth in claim 1, having means for equalizing the pressure in the two pipes on reversal of the valve, comprising openings in the intermediate ports, passages connected to the compressed air inlet opening for establishing communication between said ports and the compressed air inlet opening and automatic valves for said openings arranged to open on the pressure in the respective intermediate port exceeding the pressure in the said passages.

4. In the combination as set forth in claim 1, a master valve comprising a casing having a compressed air inlet and having two ports therein, in open communication with the supply pipes for supplying compressed air to the piston valve, a rotary valve member in said casing having a U-shaped passage therein adapted at one end to register alternately with each of said ports, a passage in said valve casing open to the atmosphere, the other end of the U-shaped passage in the rotary valve member being located to register permanently with said passage in the valve casing, a port in the rotary valve member in open communication with the compressed air inlet and located to register alternately with each of the ports in the valve casing and driving means connected to the rotary valve member for rotating the same.

In testimony whereof I have signed my name to this specification.

OTTO MEYER.